(12) United States Patent
Lafly et al.

(10) Patent No.: US 12,337,982 B2
(45) Date of Patent: Jun. 24, 2025

(54) AIRCRAFT AIR INLET COMPRISING AT LEAST TWO WALLS CONNECTED END TO END BY WELDING, METHOD FOR THE ASSEMBLY OF SUCH AN AIR INLET, AND AIRCRAFT COMPRISING AT LEAST ONE SUCH AIR INLET

(71) Applicant: Airbus Operations SAS, Toulouse (FR)

(72) Inventors: Anne-Laure Lafly, Toulouse (FR); Wolfgang Brochard, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/405,325

(22) Filed: Jan. 5, 2024

(65) Prior Publication Data

US 2024/0253799 A1 Aug. 1, 2024

(30) Foreign Application Priority Data

Jan. 31, 2023 (FR) ........................................ 2300853

(51) Int. Cl.
*B64D 29/08* (2006.01)
*F01D 25/00* (2006.01)

(52) U.S. Cl.
CPC .............. *B64D 29/08* (2013.01); *F01D 25/00* (2013.01); *F05D 2230/239* (2013.01)

(58) Field of Classification Search
CPC .......... F02C 7/04; F01D 25/28; F01D 25/285; F05D 2230/232; F05D 2230/239; B64D 29/08; B64D 2033/0226; B64D 2033/0286; B64D 29/00; B64D 33/02; B64C 21/10
See application file for complete search history.

(56) References Cited

U.S. PATENT DOCUMENTS

| 6,328,258 | B1 * | 12/2001 | Porte | F02C 7/045 |
| | | | | 244/62 |
| 9,663,238 | B2 * | 5/2017 | Kane | B64D 33/02 |
| 9,764,849 | B2 | 9/2017 | Stark | |
| 10,589,869 | B2 * | 3/2020 | Wittman | F02C 7/05 |

(Continued)

FOREIGN PATENT DOCUMENTS

EP 2304204 B1 3/2016

OTHER PUBLICATIONS

French Search Report for corresponding French Patent Application No. 2300853 dated Jul. 25, 2023.

(Continued)

*Primary Examiner* — Brian P Wolcott
(74) *Attorney, Agent, or Firm* — Greer, Burns & Crain, Ltd.

(57) ABSTRACT

An air inlet of a nacelle of an aircraft including a lip having a leading edge configured to split an air flow into interior and exterior air flows, the interior air flow entering the air inlet, an exterior panel, an intermediate panel, interposed between the lip and the exterior panel, having a first edge connected to the lip by at least a first connection and a second edge connected to the exterior panel by at least a second connection, the first connection connecting the first edge of the intermediate panel and the lip comprising at least one butt weld bead having an outer face in the extension of the outer faces of the lip and of the intermediate panel.

8 Claims, 7 Drawing Sheets

(56) References Cited

U.S. PATENT DOCUMENTS

| | | | | |
|---|---|---|---|---|
| 10,676,203 | B2* | 6/2020 | Porte | B64F 5/40 |
| 11,655,045 | B2* | 5/2023 | Porte | B64D 29/00 |
| | | | | 244/53 B |
| 12,116,931 | B2* | 10/2024 | Guillois | F02C 7/045 |
| 2011/0168852 | A1* | 7/2011 | Porte | B64C 21/10 |
| | | | | 427/299 |
| 2011/0197973 | A1* | 8/2011 | Binks | B64D 29/08 |
| | | | | 137/15.1 |
| 2017/0107905 | A1 | 4/2017 | Brown et al. | |
| 2020/0031487 | A1* | 1/2020 | Wittman | F02C 7/05 |
| 2020/0130856 | A1 | 4/2020 | West | |
| 2021/0107666 | A1 | 4/2021 | Porte et al. | |

OTHER PUBLICATIONS

French Written Opinion for corresponding French Patent Application No. 2300853 dated Jan. 31, 2023.

* cited by examiner

PRIOR ART

AIRCRAFT AIR INLET COMPRISING AT LEAST TWO WALLS CONNECTED END TO END BY WELDING, METHOD FOR THE ASSEMBLY OF SUCH AN AIR INLET, AND AIRCRAFT COMPRISING AT LEAST ONE SUCH AIR INLET

CROSS-REFERENCES TO RELATED APPLICATIONS

This application claims the benefit of French Patent Application Number 2300853 filed on Jan. 31, 2023, the entire disclosure of which is incorporated herein by way of reference.

FIELD OF THE INVENTION

The present application relates to an air inlet of a nacelle of an aircraft, to a method for the assembly of such an air inlet and to an aircraft comprising at least one such air inlet.

BACKGROUND OF THE INVENTION

Figure 1:
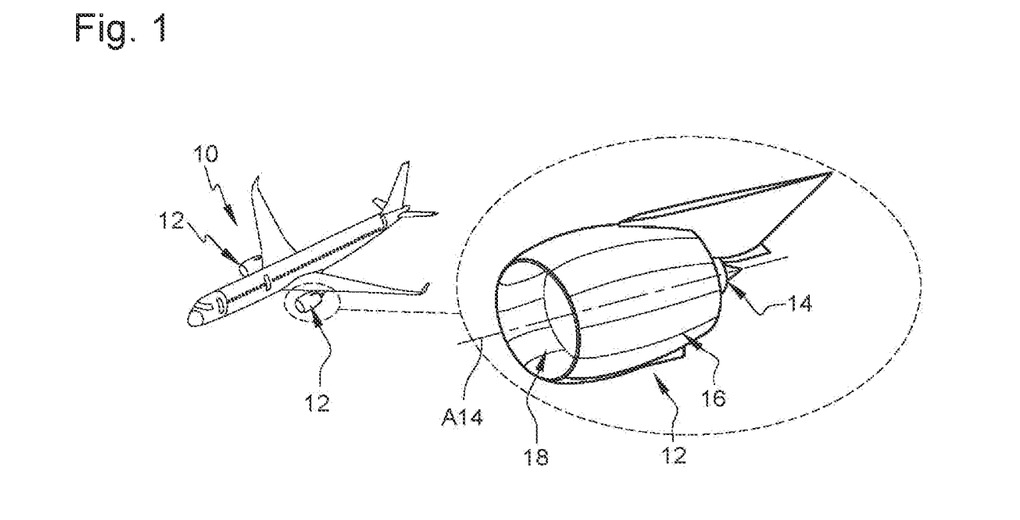
FIG. 1 is a perspective view of an aircraft and, taken from this view, a propulsion assembly shown in an enlarged view, illustrating an embodiment.

According to an embodiment visible in FIG. 1, an aircraft 10 comprises several propulsion assemblies 12 each comprising an engine 14 and a nacelle 16 surrounding the engine 14 and making it possible in particular to channel an air flow towards the engine 14.

The engine 14 has an axis of rotation A14. In the rest of the description, a longitudinal direction is a direction parallel to the axis of rotation A14. A longitudinal plane is a plane containing the axis of rotation A14. A transverse plane is a plane perpendicular to the axis of rotation A14. The concepts of front and rear refer to the direction of flow of the air flow in the engine in operation, this air flow flowing from the front to the rear.

Each nacelle 16 comprises, at the front, an air inlet 18 configured to separate a laminar air flow 20 into an interior laminar air flow 20.1 which enters the nacelle 16 in the direction of the engine 14 and an exterior laminar air flow 20.2 flowing on the outside of the nacelle 16.

Figure 2:
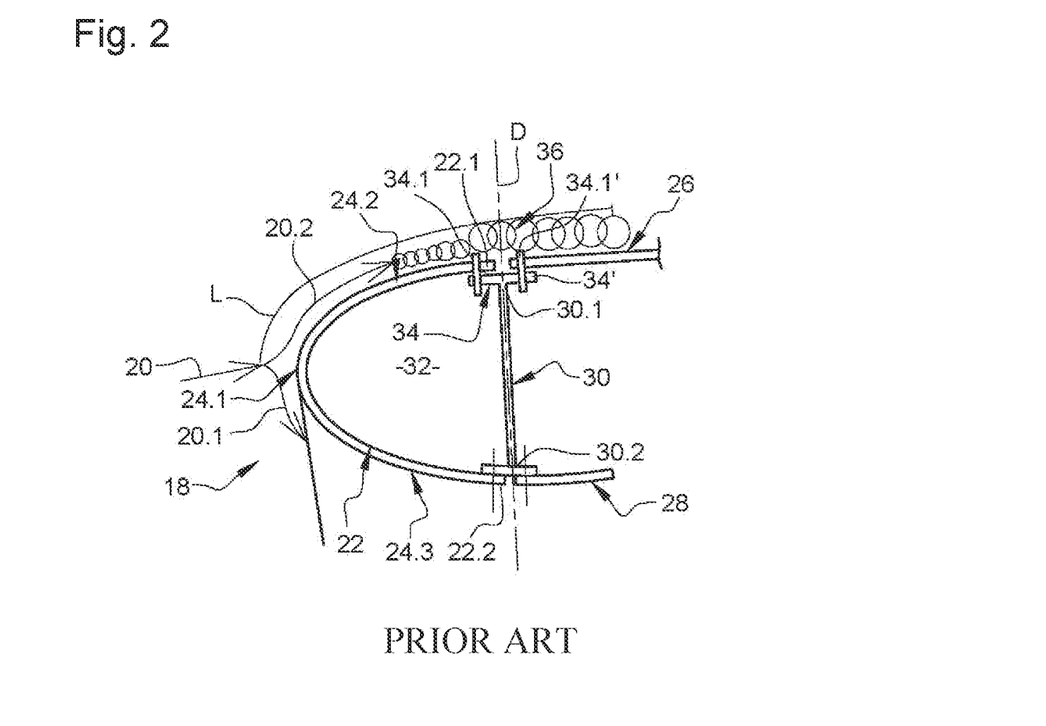
FIG. 2 is a longitudinal cross section through an air inlet of a nacelle of an aircraft illustrating an embodiment of the prior art.
Figure 3:
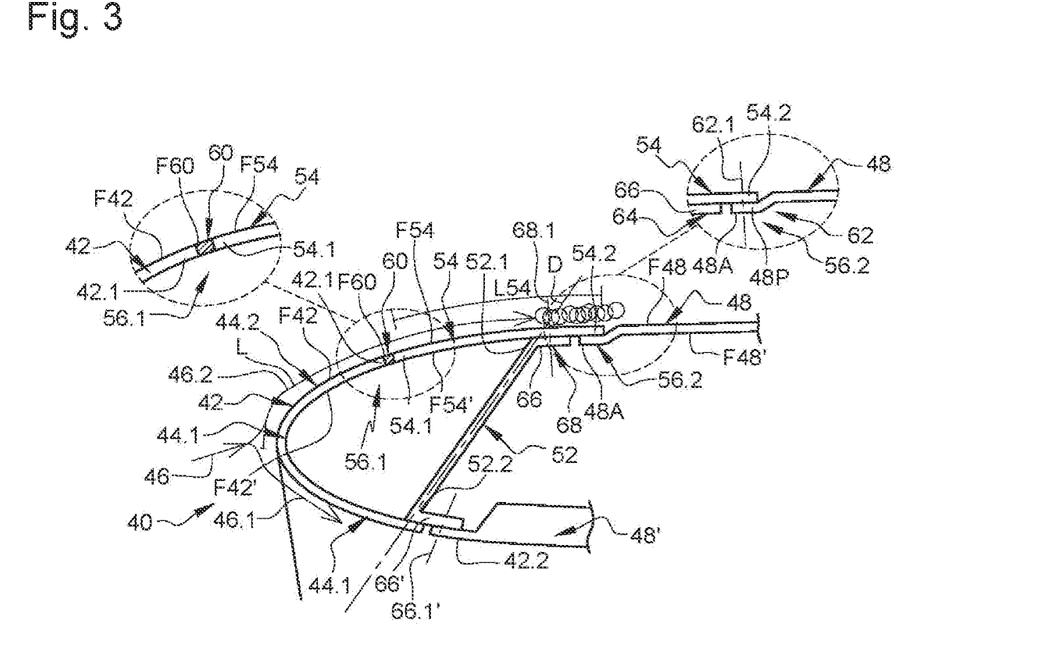
FIG. 3 is a longitudinal cross section through an air inlet of a nacelle of an aircraft illustrating a first embodiment of the invention.

According to embodiments visible in FIGS. 2 and 3, an air inlet 18 comprises a lip 22 which has a C shape in cross section in a longitudinal plane. The lip 22 comprises a leading edge 24.1 which splits the air flow 20 in an interior air flow 20.1 and an exterior flow 20.2, an exterior portion 24.2 which extends from the leading edge 24.1 to an exterior rear edge 22.1 of the lip 22 and over which the exterior air flow 20.2 flows, and an interior portion 24.3 which extends from the leading edge 24.1 to an interior rear edge 22.2 of the lip 22 and over which the interior air flow 20.1 flows.

The air inlet 18 also comprises an exterior panel 26 positioned in the extension of the exterior portion 24.2 of the lip 22, an interior panel 28 positioned in the extension of the interior portion 24.3 of the lip 22 and a front frame 30, in the form of a ring, which has a first end 30.1 connected to the exterior portion 24.2 of the lip 22 and to the exterior panel 26 and a second end 30.2 connected to the interior portion 24.3 of the lip 22 and to the interior panel 28. The front frame 30 and the lip 22 delimit an annular duct 32 in the shape of a D, called the D-duct.

The first end 30.1 of the front frame 30 has a T shape including first and second wings 34, 34' pressed respectively against the exterior portion 24.2 of the lip 22 and the exterior panel 26, the first wing 34 being connected to the exterior portion 24.2 of the lip 22 by a first series of connection elements 34.1, the second wing 34' being connected to the exterior panel 26 by a second series of connection elements 34.1'.

According to this embodiment, the front frame 30 is inclined slightly, such that the straight line D, passing via the exterior and interior ends 30.1, 30.2 forms, with a transverse plane, an angle of less than 10°.

In operation, the exterior flow 20.2 is laminar from the leading edge 24.1 (also referred to as the aerodynamic stagnation point) over a certain length L. This length L must be as long as possible in order to reduce the drag generated by the air inlet 18 of the nacelle 16. In the absence of connection elements (such as screws, rivets or the like), the theoretical length L, which characterizes the laminar air zone, could reach a distance of the order of 400 to 950 mm, depending on the size of the nacelle. According to the embodiment visible in FIG. 2, the air inlet 18 comprises connection elements 34.1, 34.1' which are separated from the leading edge 24.1 by a distance of less than 500 mm, of the order of 300 mm, which generate disruption 36 and reduce the length L, resulting in an increase in the drag of the air inlet 18 of the nacelle 16 and, ultimately, in the fuel consumption of the aircraft 10.

The present invention aims to overcome all or some of the drawbacks of the prior art.

SUMMARY OF THE INVENTION

To this end, the invention relates to an air inlet of a nacelle of an aircraft including:
   a lip having outer and inner faces and a leading edge configured to split an air flow into exterior and interior air flows, the interior air flow entering the air inlet, the exterior air flow being laminar over a given length,
   an exterior panel having an outer face against which the exterior air flow flows in operation, an inner face opposite to the outer face and a front edge oriented towards the lip, and,
   a front frame, in the form of a ring, which has exterior and interior edges.

According to the invention, the air inlet comprises an intermediate panel, interposed between the lip and the exterior panel, having an outer face against which the exterior air flow flows in operation, an inner face opposite to the outer face, a first edge connected to the lip by at least a first connection and a second edge connected to the exterior panel by at least a second connection. Additionally, the first connection connecting the first edge of the intermediate panel and the lip comprises at least a first butt weld bead having an outer face in the extension of the outer faces of the lip and of the intermediate panel.

This solution makes it possible to preserve the exterior laminar air flow over a great length and thus to reduce the drag and the fuel consumption of an aircraft including at least one such air inlet.

According to another feature, the exterior panel has offset bending in the vicinity of its front edge and an overlapping portion, located between the offset bending and the front edge, positioned against the inner face of the intermediate panel. In addition, the second connection comprises connection elements connecting the intermediate panel and the exterior panel in the overlapping portion thereof.

According to another feature, the second connection connecting the second edge of the intermediate panel and the exterior panel is separated from the leading edge by a distance greater than or equal to the given length of the exterior laminar air flow.

According to another feature, the air inlet comprises a third connection connecting the exterior edge of the front frame and at least one wall selected from among the lip, the exterior panel and the intermediate panel.

According to another feature, the front frame comprises an exterior rim pressed against the inner face of the intermediate panel, the exterior rim and the front frame forming a single same piece. In addition, the third connection comprises at least a first series of connection elements connecting the exterior rim and the intermediate panel, the connection elements of the first series being separated from the leading edge by a distance greater than or equal to the given length of the exterior laminar air flow.

According to another alternative, the third connection comprises at least an inner extension rigidly secured to the intermediate panel, oriented towards the front frame and connected to the latter, the inner extension and the intermediate panel forming a single same piece.

According to another alternative, the third connection comprises at least one junction element having a first wing pressed against the inner face of at least one wall selected from among the lip, the exterior panel and the intermediate panel and connected to this wall, and a second wing pressed against the front frame and connected to the latter.

According to another feature, the first wing of each junction element is connected by at least one weld bead to the wall selected from among the lip, the exterior panel and the intermediate panel.

The invention also relates to an aircraft including at least one air inlet according to one of the above features.

The invention also relates to a method for the assembly of an air inlet according to one of the above features. According to the invention, the assembly method comprises a step of assembling the lip or a part of the lip and the intermediate panel or a part of the intermediate panel by welding by virtue of at least a first butt weld bead, a step of assembling the exterior and intermediate panels and a step of assembling the front frame. According to another feature, the first butt weld bead is obtained by friction stir welding. According to another feature, the assembly method comprises a step of calibration of the first butt weld bead so that its outer face lies flush with the outer faces of the lip and of the intermediate panel.

According to another feature, the assembly method comprises a step of production of first and second semi-lips which are substantially symmetrical about a longitudinal plane of symmetry, and of first and second semi-junction elements which are substantially symmetrical about the longitudinal plane of symmetry, and a step of securing the first semi-junction element to the inner face of the first semi-lip so as to obtain a first lip half and securing the second semi-junction element to the inner face of the second semi-lip so as to obtain a second lip half.

According to another feature, the method comprises a step of assembling the first and second lip halves by connecting them via first and second longitudinal butt weld beads in such a way as to obtain a lip.

According to another feature, the lip is continuous over the entire circumference of the air inlet, the intermediate panel comprising an opening delimited by longitudinal edges of the intermediate panel and by a part of an exterior rear edge of the lip. In addition, the assembly method comprises, after the step of assembling the lip and the intermediate panel, a step of machining for the purpose of rectifying or calibrating the longitudinal edges of the intermediate panel and the exterior rear edge of the lip.

BRIEF DESCRIPTION OF THE DRAWINGS

Further features and advantages will emerge from the description of the invention below, which is provided solely by way of example, with reference to the attached drawings in which.

DETAILED DESCRIPTION OF THE PREFERRED EMBODIMENTS

According to an embodiment visible in FIG. 3, an air inlet 40 of a nacelle of an aircraft comprises a lip 42 which has, in cross section in a longitudinal plane, a C shape. The lip 42 comprises a leading edge 44.1, also referred to as the aerodynamic stagnation point, which splits the air flow 46 into an interior air flow 46.1 and an exterior air flow 46.2, an exterior portion 44.2 which extends from the leading edge 44.1 to an exterior rear edge 42.1 of the lip 42 and over which the exterior air flow 46.2 flows, and an interior portion 44.3 which extends from the leading edge 44.1 to an interior rear edge 42.2 of the lip 42 and over which the interior air flow 46.1 flows. The exterior air flow 46.2 is laminar over a length L, measured from the leading edge 44.1 (or aerodynamic stagnation point), which may for example be between 400 and 950 mm depending on the dimensions of the nacelle.

This lip 42 comprises an outer face F42 against which the interior air flow 46.1 and exterior air flow 46.2 flow in operation and an inner face F42' opposite to the outer face F42.

According to one configuration, the lip 42 is made of aluminum alloy. According to one mode of production, the lip 42 is obtained by assembling several angular sectors in such a way as to obtain a one-piece component which extends over the entire circumference of the air inlet 40.

The air inlet 40 also comprises an exterior panel 48 which has an outer face F48 against which the exterior air flow 46.2 flows in operation and an inner face F48' opposite to the outer face F48. This exterior panel 48, which is approximately cylindrical, has a front edge 48A oriented towards the lip 42. This exterior panel 48 may extend over the entire circumference of the air inlet 40 or may not extend thus and comprise longitudinal edges 48.1, 48.2 delimiting an opening 50.

According to one configuration, the exterior panel 48 is made of aluminum alloy or of a composite.

The air inlet 40 may comprise an interior panel 48' which has an outer face against which the interior air flow 46.1 flows in operation. This interior panel 48' is not described further as it may be identical to those of prior art air inlets.

The air inlet 40 further comprises a front frame 52, in the form of a ring, which has exterior and interior edges 52.1, 52.2.

According to one configuration, the front frame 52 is made of titanium alloy or of aluminum alloy. According to one mode of production, the front frame 52 is obtained by assembling several angular sectors in such a way as to obtain a one-piece component.

According to one feature of the invention, the air inlet 40 comprises an intermediate panel 54, interposed between the lip 42 and the exterior panel 48, which has a first edge 54.1 connected to the lip 42 by at least a first connection 56.1 and a second edge 54.2 connected to the exterior panel 48 by at least a second connection 56.2.

The intermediate panel 54 has an outer face F54 against which the exterior laminar air flow 46.2 flows in operation and an inner face F54' opposite to the outer face F54.

The intermediate panel 54 is made of a material identical to that of the lip 42. According to one configuration, the intermediate panel 54 is preferably made of aluminum alloy. The intermediate panel 54 is approximately cylindrical. It may extend over the entire circumference of the air inlet 40 or may not extend thus and comprise longitudinal edges 58.1, 58.2 located in the extension of the longitudinal edges 48.1, 48.2 of the exterior panel 48 delimiting the opening 50.

According to one feature of the invention, the first connection 56.1 connecting the first edge 54.1 of the intermediate panel 54 and the lip 42 comprises at least a first butt weld bead 60 having an outer face F60 in the extension of the outer faces F42 and F54 of the lip 42 and of the intermediate panel 54. This first butt weld bead 60 does not give rise to any disruption. Consequently, even if it is close to the leading edge 44.1, it makes it possible to preserve the exterior laminar air flow 46.2. This solution makes it possible to reduce the drag and the fuel consumption of an aircraft including at least one such air inlet 40.

The fact that the exterior and intermediate panels 48, 54 have longitudinal edges 48.1, 48.2, 58.1, 58.2 and do not have a closed section makes it possible to better manage the end to end positioning of the exterior rear edge 42.1 of the lip 42 and the first edge 54.1 of the intermediate panel 54 when the first butt weld bead 60 is being produced. To be specific, this open section allows greater flexibility of the exterior and intermediate panels 48, 54 for the purposes of managing fittings and tolerances, unlike a more rigid closed section.

According to one embodiment, the first butt weld bead 60 is obtained by friction stir welding, or FSW.

According to one embodiment, the first butt weld bead 60 is calibrated in such a way that its outer face F60 lies flush with the outer faces F42 and F54 of the lip 42 and of the intermediate panel 54.

According to embodiments visible in FIGS. 2, 7, 8 and 9, the exterior panel 48 has offset bending 62 in the vicinity of its front edge 48A and substantially parallel to the latter and an overlapping portion 48P located between the offset bending 62 and the front edge 48A. When the exterior and intermediate panels 48, 54 are assembled, the overlapping portion 48P of the exterior panel 48 is positioned against the inner face F54' of the intermediate panel 54. According to these embodiments visible in FIGS. 2, 7, 8 and 9, the second connection 56.2 comprises connection elements 62.1, distributed over the circumference of the air inlet 40, connecting the intermediate panel 54 and the exterior panel 48 at its overlapping portion 48P.

Naturally, the invention is not limited to this embodiment as regards the second connection 56.2. According to another embodiment visible in FIG. 10, the second connection 56.2 comprises at least one junction element 64, in the form of a strip of material, positioned straddling the inner faces F48', F54' of the exterior and intermediate panels 48, 54 and first and second series of connection elements 64.1, 64.2 distributed over the circumference of the air inlet 40. The connection elements 64.1 of the first series connect the intermediate panel 54 and the junction element 64. The connection elements 64.2 of the second series connect the exterior panel 48 and the junction element 64. According to one configuration visible in FIG. 10, the junction element 64 corresponds to a part of the front frame 52, such as a rim 66 of the front frame 52. The junction element 64 of the second connection 56.2 could be a splice plate or the second connection 56.2 could comprise at least one second butt weld bead obtained by friction stir welding, like the first butt weld bead 60.

Whatever the embodiment, the intermediate panel 54 has a length L54 sufficient for the second connection 56.2 and more specifically the connection elements 62.1, 64.1 to be separated from the leading edge 44.1 by a distance greater than or equal to the length L of the exterior laminar air flow 46.2. Thus, the latter is not disrupted over this length L.

Figure 8:
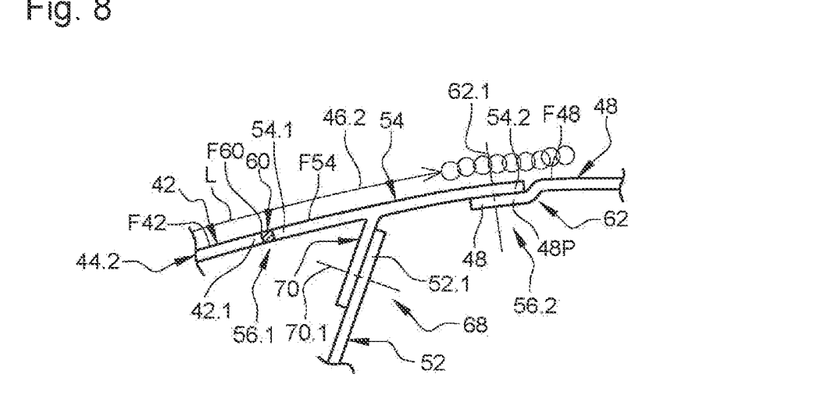
FIG. 8 is a longitudinal cross section through the exterior panel of the air inlet visible in FIG. 6.
Figure 9:
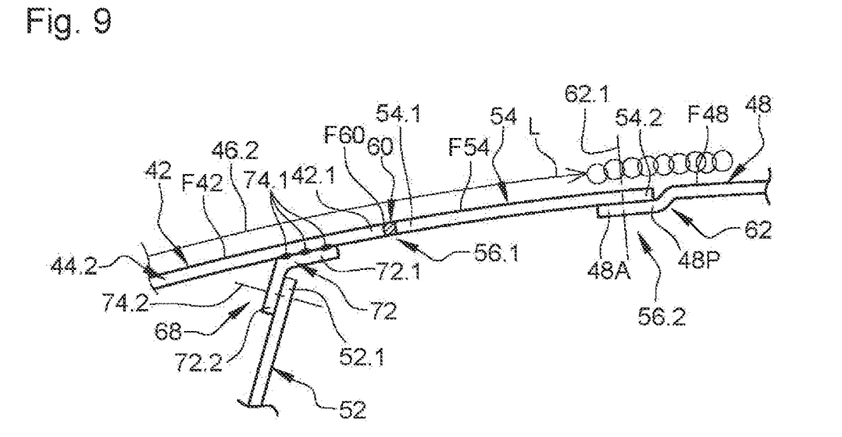
FIG. 9 is a longitudinal cross section through a part of an air inlet of a nacelle of an aircraft illustrating a third embodiment of the invention.
Figure 10:
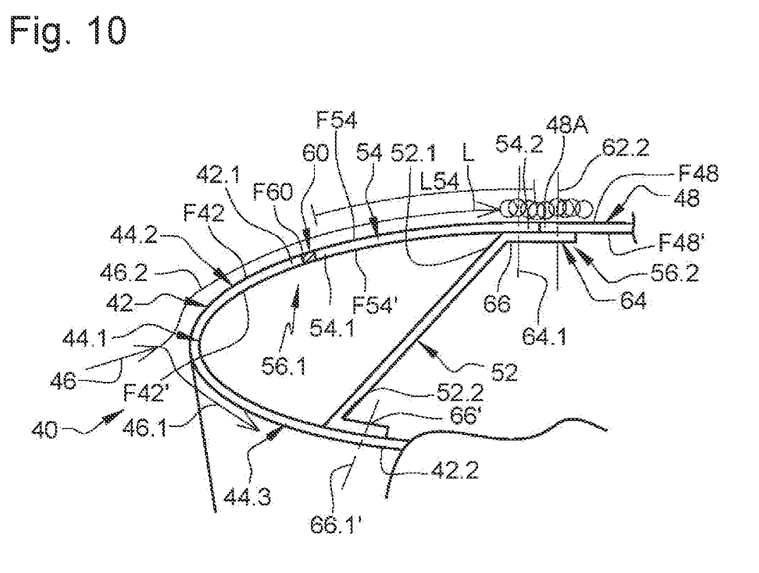
FIG. 10 is a longitudinal cross section through a part of an air inlet of a nacelle of an aircraft illustrating a fourth embodiment of the invention.

The air inlet 40 comprises at least a third connection 68 connecting the exterior edge 52.1 of the front frame 52 and at least one wall selected from among the lip 42 (as shown in FIG. 9), the exterior panel 48 (as shown in FIG. 10) and the intermediate panel 54 (as shown in FIGS. 3, 8 and 10).

According to the various embodiments, the third connection 68 is positioned between the leading edge 44.1 and the first connection 56.1 as shown in FIG. 9, between the first and second connections 56.1, 56.2 as shown in FIGS. 3 and 8, at the second connection 56.2 as shown in FIG. 10 or to the rear of the second connection 56.2.

According to embodiments visible in FIGS. 3 and 10, the front frame 52 comprises an exterior rim 66 pressed against the inner face F54' of the intermediate panel 54 and, optionally, against the inner face F48' of the exterior panel 48 as shown in FIG. 10, the exterior rim 66 and the front frame 52 forming a single same piece. According to these embodiments, the third connection 68 comprises a first series of connection elements 64.1, 68.1 connecting the exterior rim 66 and the intermediate panel 54 and optionally a second series of connection elements 64.2 connecting the exterior rim 66 and the exterior panel 48, as shown in FIG. 10. The connection elements 64.1, 68.1 of the first series are separated from the leading edge 44.1 by a distance greater than or equal to the length L of the exterior laminar air flow 46.2. Thus, the latter is not disrupted over this length L.

According to the embodiments visible in FIGS. 3 and 10, the front frame 52 is significantly inclined so as keep the connection elements 64.1, 68.1 connecting the front frame 52 and the intermediate panel 54 as far away as possible from the leading edge 44.1. According to these embodiments, a straight line D, passing through the exterior and interior edges 52.1, 52.2, makes, with a transverse plane, an angle of greater than 30°.

Figure 6:
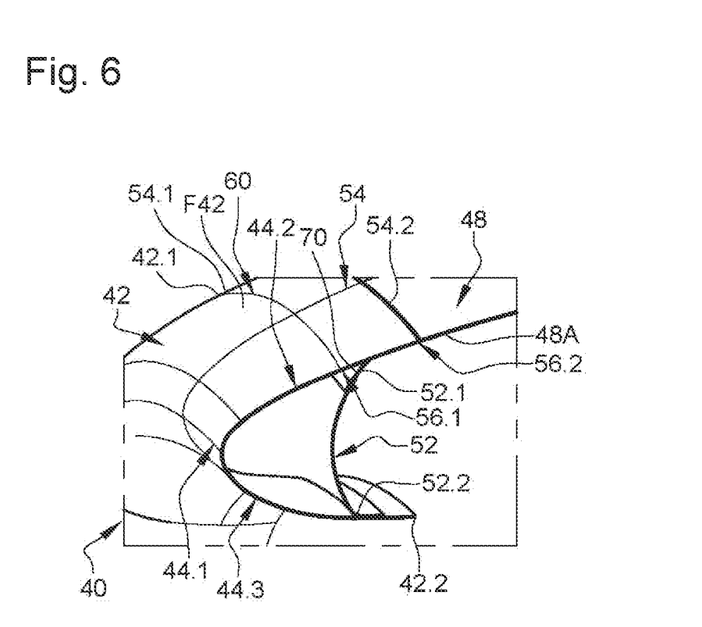
FIG. 6 is a perspective view of a part of an air inlet of a nacelle of an aircraft illustrating a second embodiment of the invention.
Figure 7:
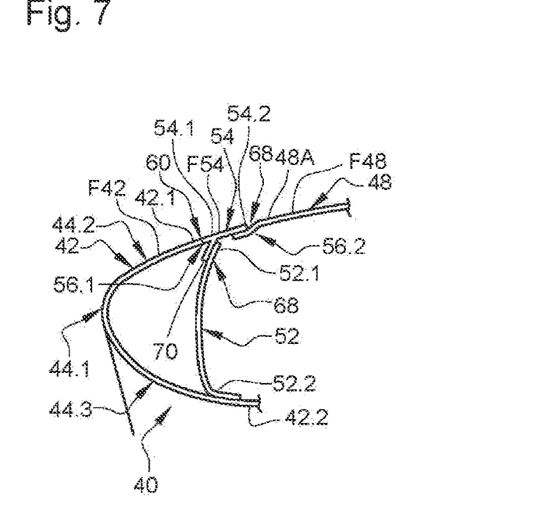
FIG. 7 is a longitudinal cross section through the air inlet visible in FIG. 6.

According to another embodiment illustrated by FIGS. 6 to 8, the third connection 68 comprises at least an inner extension 70 rigidly secured to the intermediate panel 54, oriented towards the front frame 52 and connected to the latter by connection elements 70.1, in particular at least one series of connection elements 70.1 distributed over the circumference of the nacelle. The inner extension 70 and the intermediate panel 54 form a single same piece. According to the embodiment visible in FIGS. 6 to 8, it is not necessary to significantly incline the front frame 52 as is necessary for the embodiments visible in FIGS. 3 and 10.

Naturally, the invention is not limited to these embodiments as regards the third connection 68. According to another embodiment visible in FIG. 9, the third connection 68 comprises at least one junction element 72, in the form of a bracket for example, having a first wing 72.1 pressed against the inner face F42' of the lip 42 and connected to the latter by connection elements, at least one weld bead 74.1 or spot welds, and a second wing 72.2 pressed against the front frame 52 and connected to the latter by connection elements 74.2, in particular at least one series of connection elements 74.2 distributed over the circumference of the nacelle. The first wing 72.1 is not necessarily connected to the lip 42. It may be connected to at least one wall selected from among the lip 42, the intermediate panel 54 and the exterior panel 48. Connecting the first wing 72.1 to the lip 42 or to the intermediate panel 54 makes it possible to obtain a front frame 52 which is slightly inclined. By way of example, the first wing 72.1 of each junction element 72 is connected to the lip 42, to the intermediate panel 54 or to the exterior panel 48 by at least one weld bead obtained by friction stir welding, or FSW.

According to a first variant, the third connection 68 comprises a single junction element 72 which extends over the entire circumference of the air inlet 40. According to a second variant, the third connection 68 comprises several junction elements 72 distributed over the circumference of the air inlet 40.

According to various embodiments visible in FIGS. 3, 6, 7 and 10, the interior edge 52.2 of the front frame 52 comprises a rim 66' pressed against the inner face of at least one wall out of the interior portion 44.3 of the lip 42 and the interior panel 48' and connected to said wall by a series of connection elements 66.1'.

Figure 4:
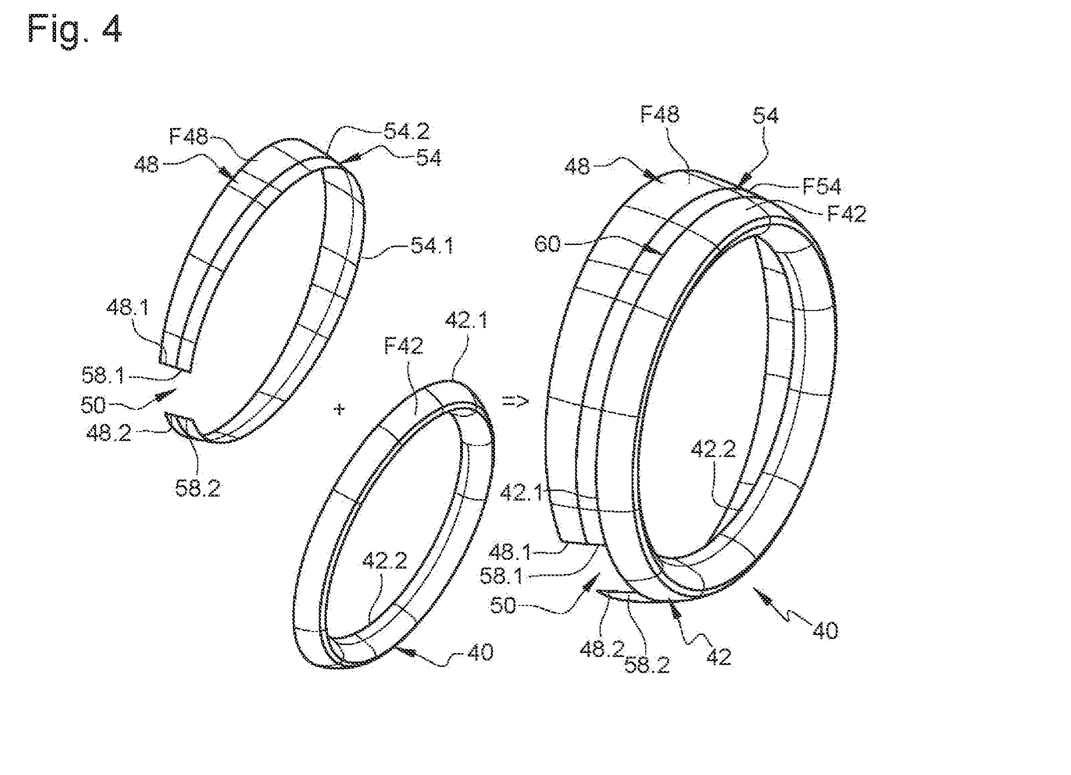
FIG. 4 is a perspective view of the various parts of the air inlet visible in FIG. 3 in various steps of their assembly illustrating a first mode of assembly of the invention.

According to a first mode of operation visible in FIG. 4, a method for the assembly of the air inlet 40, visible in FIG. 3 for example, comprises a step of production of the lip 42, the intermediate panel 54 and the exterior panel 48 independently of one another; a step of machining of the exterior rear edge 42.1 of the lip 42 and the first edge 54.1 of the intermediate panel 54; a step of assembling the exterior and intermediate panels 48, 54; a step of assembling the lip 42 and the intermediate panel 54 by connecting them via welding by virtue of least a first butt weld bead 60; a step of calibration of the first butt weld bead 60 and lastly a step of assembling the front frame 52.

The assembly method may comprise a step of anodization and/or a step of heat treatment, after the step of welding, to stabilize the part.

Figure 5:
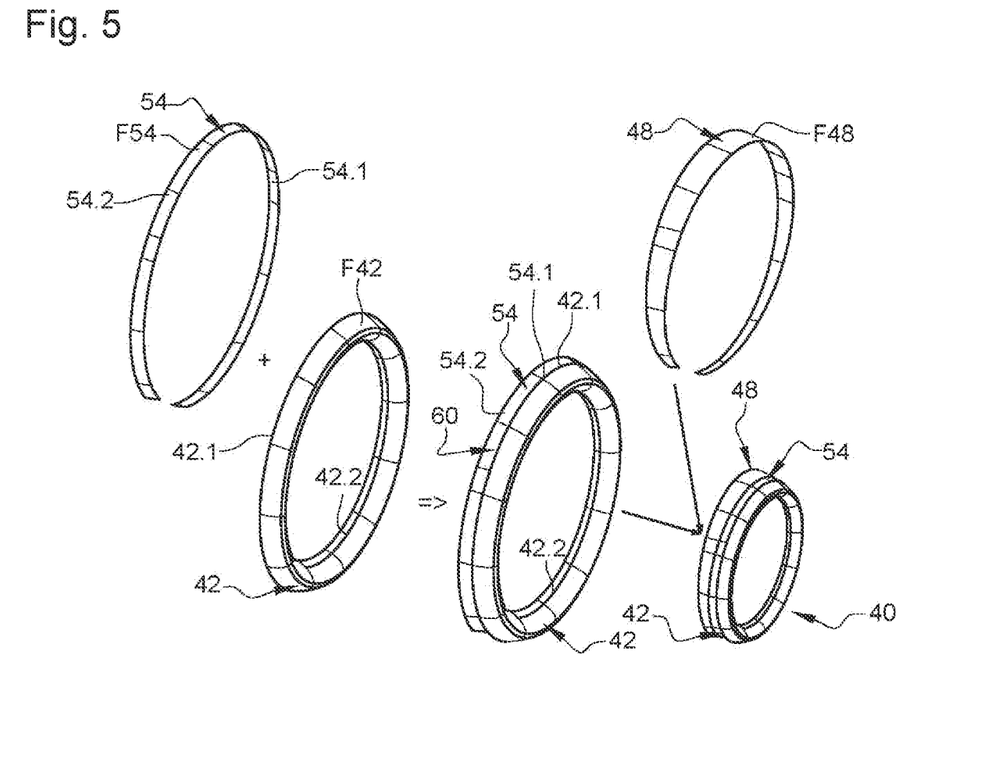
FIG. 5 is a perspective view of the various parts of the air inlet visible in FIG. 3 in various steps of their assembly illustrating a second mode of assembly of the invention.

According to a second mode of operation visible in FIG. 5, a method for the assembly of the air inlet 40, visible in FIG. 3 for example, comprises a step of production of the lip 42, the intermediate panel 54 and the exterior panel 48 independently of one another; a step of machining of the exterior rear edge 42.1 of the lip 42 and the first edge 54.1 of the intermediate panel 54; a step of assembling the lip 42 and the intermediate panel 54 by connecting them via welding by virtue of at least a first butt weld bead 60; a step of calibration of the first butt weld bead 60; a step of assembling the exterior and intermediate panels 48, 54 and lastly a step of assembling the front frame 52.

Figure 11:
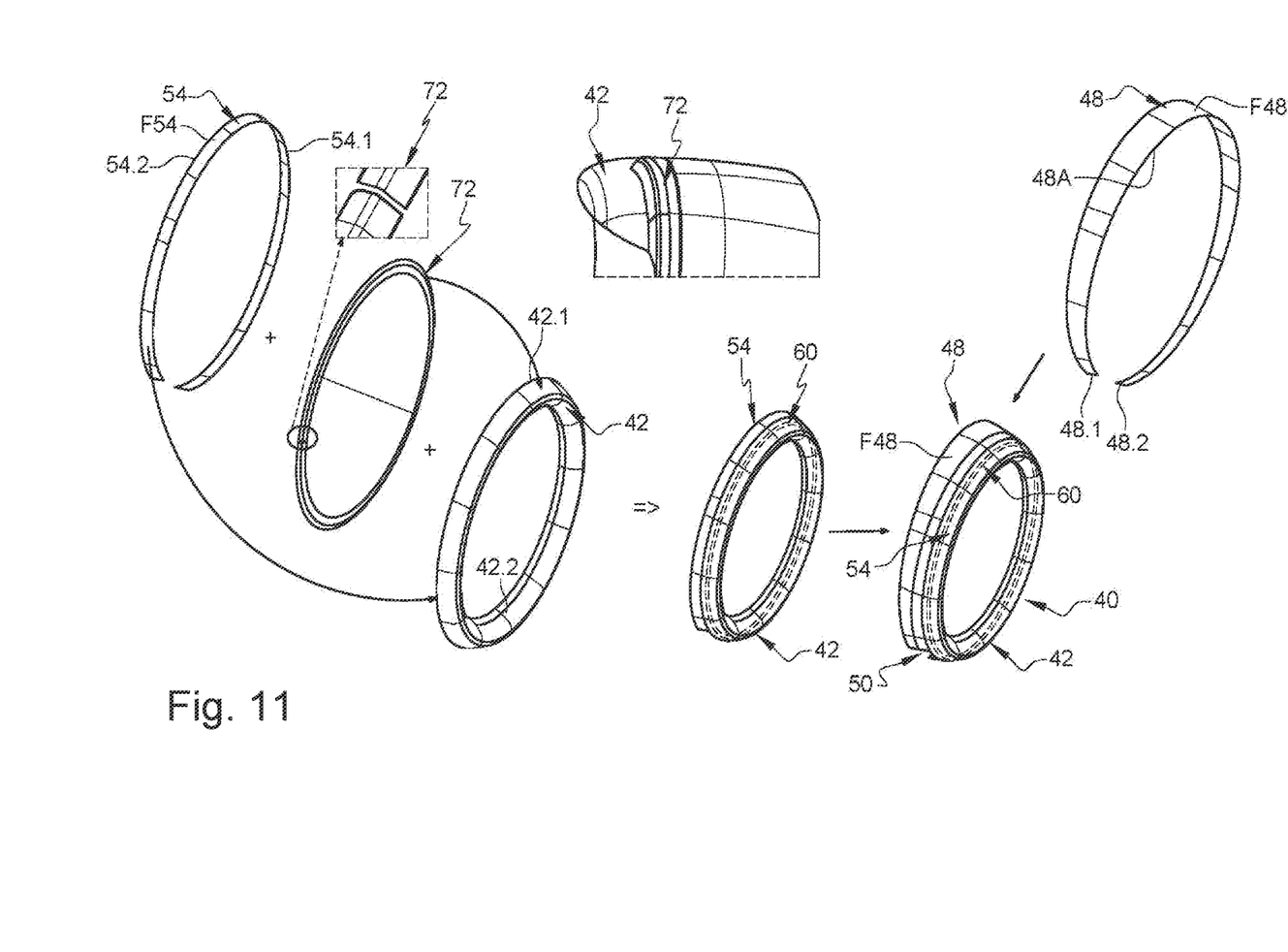
FIG. 11 is a perspective view of the various parts of an air inlet in various steps of their assembly illustrating a third mode of assembly of the invention.

According to a third mode of operation visible in FIG. 11, a method for the assembly of the air inlet 40, visible in FIG. 9, comprises a step of production of the lip 42, the intermediate panel 54 and the exterior panel 48 independently of one another; a step of machining of the exterior rear edge 42.1 of the lip 42 and the first edge 54.1 of the intermediate panel 54; a step of securing the junction element(s) 72 to the inner face F42' of the lip 42; a step of assembling the lip 42 and the intermediate panel 54 by welding by virtue of at least a first butt weld bead 60; a step of calibration of the first butt weld bead 60, a step of assembling the exterior and intermediate panels 48, 54 and lastly a step of assembling the front frame 52.

Figure 12:
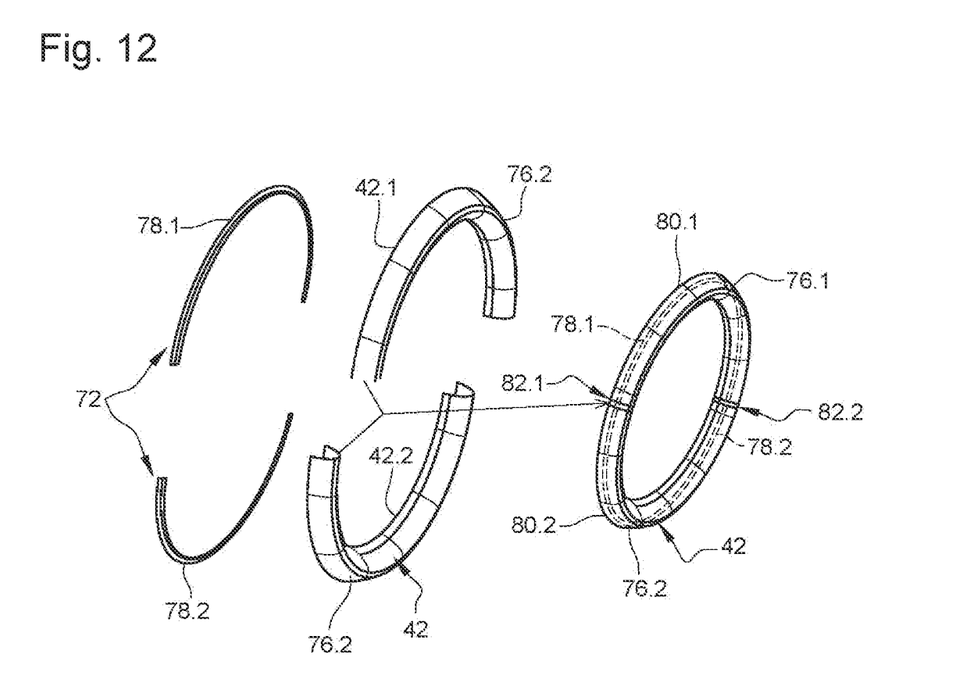
FIG. 12 is a perspective view of the various parts of a lip in various steps of their assembly illustrating a mode of assembly of the invention, and, FIG. 13 is a schematic side view of a part of an air inlet including a cut-out, before and after a step of machining, illustrating an embodiment of the invention.

According to another embodiment visible in FIG. 12, the lip 42 is obtained from first and second semi-lips 76.1, 76.2 which are substantially symmetrical about a longitudinal plane of symmetry, preferably. Likewise, the junction element 72 is obtained from first and second semi-junction elements 78.1, 78.2 which are substantially symmetrical about the longitudinal plane of symmetry. A method for the assembly of such a lip 42 comprises a step of production of the first and second semi-lips 76.1, 76.2 and of the first and second semi-junction elements 78.1, 78.2, a step of securing the first semi-junction element 78.1 to the inner face of the first semi-lip 76.1 so as to obtain a first lip half 80.1, and securing the second semi-junction element 78.2 to the inner face of the semi-lip 76.2 so as to obtain a second lip half 80.2, then a step of assembling the first and second lip halves 80.1, 80.2 by connecting them via first and second longitudinal butt weld beads 82.1, 82.2 in such a way as to obtain a lip 42.

Likewise, the intermediate panel 54 may be obtained from first and second semi-intermediate panels which are substantially symmetrical about the longitudinal plane of symmetry. According to a first variant, the method for the assembly of the air inlet 40 comprises, after assembling the lip 42 obtained from first and second semi-lips 76.1, 76.2 and the intermediate panel 54 obtained from first and second semi-intermediate panels, a step of assembling the lip 42 and intermediate panel 54 by welding by virtue of at least a first butt weld bead 60. According to a second variant, the assembly method comprises a first step of assembling the first lip half 80.1 and the first semi-intermediate panel by virtue of at least a first semi-butt weld bead so as to obtain a first air inlet half and assembling the second lip half 80.2 and the second semi-intermediate panel by virtue of at least a second semi-butt weld bead so as to obtain a second air inlet half, then a step of assembling the first and second air inlet halves by connecting them via first and second longitudinal butt weld beads 82.1, 82.2 in such a way as to obtain the air inlet 40.

Whatever the embodiment, the assembly method comprises a step of assembling the lip 42 (or a part of the lip 76.1, 76.2) and the intermediate panel 54 (or a part of the intermediate panel) by welding by virtue of at least a first butt weld bead 60. According to one configuration, the assembly method comprises a step of securing at least one junction element 72 (or a part of a junction element) against the inner face F42', F48', F54' of the lip 42 (or a part of the lip 76.1, 76.2), the intermediate panel 54 (or a part of the intermediate panel) or the exterior panel 48.

Figure 13:
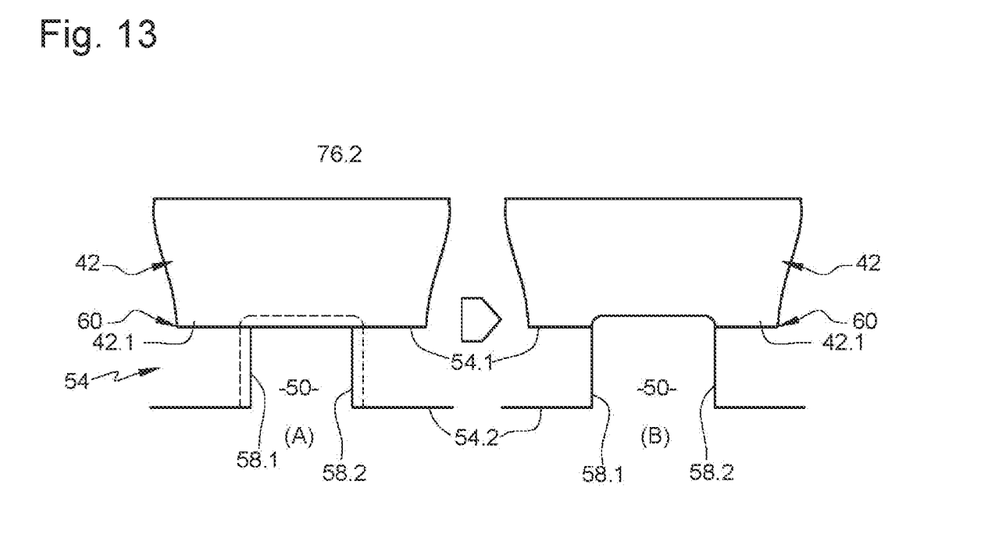

According to one embodiment, the lip 42 is continuous over the entire the circumference of the air inlet 40. In addition, the intermediate panel 54 comprises an opening 50 delimited by longitudinal edges 58.1, 58.2 of the intermediate panel 54 and by a part of the exterior rear edge 42.1 of the lip 42. The assembly method comprises, after the step of assembly by welding of the lip 42 and the intermediate panel 54 by virtue of a first butt weld bead 60 visible in part (A) of FIG. 13, a step of machining for the purpose of rectifying or calibrating the longitudinal edges 58.1, 58.2 of the intermediate panel 54 and the exterior rear edge 42.1 of the lip 42, as shown in part (B) of FIG. 13.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air inlet of a nacelle of an aircraft comprising:
a lip having outer and inner faces and a leading edge configured to split an air flow into an interior air flow and an exterior air flow, the interior air flow entering the air inlet, the exterior air flow being laminar over a length of the nacelle from an aerodynamic stagnation point at the leading edge of the lip extending aft along the outer face of the lip during operation of an aircraft engine,
an exterior panel having an outer face against which the exterior air flow flows in operation, an inner face opposite to the outer face and a front edge oriented towards the lip,
a front frame, in the form of a ring, which has exterior and interior edges, and,
an intermediate panel, interposed between the lip and the exterior panel, having an outer face against which the exterior air flow flows in operation, an inner face opposite to the outer face, a first edge connected to the lip by at least a first connection and a second edge connected to the exterior panel by at least a second connection, and
a third connection connecting an exterior edge of the front frame to the lip,
wherein the first connection connecting the first edge of the intermediate panel and the lip comprises at least a first butt weld bead having an outer face in an extension of the outer faces of the lip and of the intermediate panel,
wherein the third connection is positioned between the leading edge and the first connection.

2. The air inlet according to claim 1, wherein the exterior panel has offset bending in a vicinity of the front edge and an overlapping portion located between the offset bending and the front edge, positioned against the inner face of the intermediate panel, and
wherein the second connection comprises connection elements connecting the intermediate panel and the exterior panel in the overlapping portion thereof.

3. The air inlet according to claim 2, wherein the second connection connecting the second edge of the intermediate panel and the exterior panel is separated from the leading edge by a distance greater than or equal to the given length of the exterior air flow.

4. The air inlet according to claim 1, wherein the front frame comprises an exterior rim pressed against the inner face of the intermediate panel, the exterior rim and the front frame forming a single same piece, and
wherein the third connection comprises at least a first series of connection elements connecting the exterior rim and the intermediate panel, the connection elements of the first series being separated from the leading edge by a distance greater than or equal to the given length of the exterior air flow.

5. The air inlet according to claim 1, wherein the third connection comprises at least an inner extension rigidly secured to the intermediate panel, oriented towards the front frame and connected to the latter, the inner extension and the intermediate panel forming a single same piece.

6. The air inlet according to claim 1, wherein the third connection comprises at least one junction element having a first wing pressed against the inner face of at least one wall selected from among the lip, the exterior panel and the intermediate panel and connected to this wall, and a second wing pressed against the front frame and connected to the latter.

7. The air inlet according to claim 6, wherein the first wing of each junction element is connected by at least one weld bead to the wall selected from the lip, the exterior panel, and the intermediate panel.

8. An aircraft comprising:
at least one air inlet according to claim 1.

* * * * *